United States Patent
Hagiwara

(10) Patent No.: US 7,715,399 B2
(45) Date of Patent: May 11, 2010

(54) COMMUNICATION APPARATUS CONSTITUTING A RELAY MODE IN A COMMUNICATIONS NETWORK

(75) Inventor: Shu Hagiwara, Taito-ku (JP)

(73) Assignee: Next Magic Incorporated (JP)

( * ) Notice: Subject to any disclaimer, the term of this patent is extended or adjusted under 35 U.S.C. 154(b) by 547 days.

(21) Appl. No.: 11/660,305

(22) PCT Filed: Aug. 26, 2005

(86) PCT No.: PCT/JP2005/015502

§ 371 (c)(1),
(2), (4) Date: Feb. 15, 2007

(87) PCT Pub. No.: WO2006/025265

PCT Pub. Date: Mar. 9, 2006

(65) Prior Publication Data

US 2008/0095164 A1    Apr. 24, 2008

(30) Foreign Application Priority Data

Sep. 2, 2004    (JP) ............................ 2004-255082

(51) Int. Cl.
*H04L 12/28* (2006.01)
*H04L 12/56* (2006.01)
(52) U.S. Cl. .................................. 370/392; 370/395.32
(58) Field of Classification Search ........................ None
See application file for complete search history.

(56) References Cited

U.S. PATENT DOCUMENTS 6,480,497 B1    11/2002    Flammer, III et al.
6,640,087 B2    10/2003    Reed et al.

FOREIGN PATENT DOCUMENTS

JP    01-291553       11/1989
JP    04-368034       12/1992
JP    2004-032739     1/2004
WO    WO 03/049405 A1    6/2003

OTHER PUBLICATIONS

International Search Report for PCT/JP2005/015502 Dated Sep. 27, 2005.
Written Opinion of the International Searching Authority Application No. PCT/JP2005/015502.

*Primary Examiner*—Ayaz R Sheikh
*Assistant Examiner*—Blanche Wong
(74) *Attorney, Agent, or Firm*—Studebaker & Brackett PC; Donald R. Studebaker

(57) ABSTRACT

A communication apparatus in a relay node in a communication network includes an interface unit 12 and a core unit 13. Header data contained in framed data based on a communication signal from a signal receiving portion 21 is transmitted from the interface unit 12 to the core unit 13 and, in the core unit 13, a comparison between the header data and history data preserved in a history database are carried out and a flag responding to a result of the comparison is added to the header data, so that the header data having the flag is transmitted to the interface unit 12 from the core unit 13. In the interface unit 12, identification information in the original header data is changed in response to the flag and an output communication signal based on the framed data having the changed identification information is produced to be transmitted.

9 Claims, 6 Drawing Sheets

COMMUNICATION APPARATUS CONSTITUTING A RELAY MODE IN A COMMUNICATIONS NETWORK

TECHNICAL FIELD

The present invention relates to a communication apparatus which can be applied, for example, to constitute a relay node provided in a communication network wherein mutual communication between two communication terminals or among a plurality of communication terminals is performed.

TECHNICAL BACKGROUND

Mutual communication between two communication terminals, such as portable telephones, personal computers or the like, is usually carried out through a predetermined communication network in the form of wireless system or wire system. There has been proposed a wireless communication network by the name of mesh network as one of such communication networks.

The mesh network is different from a known communication network constituted with a base node which functions as a central controller and a plurality of relay nodes which are under the control by the base node. In the mesh network, any node corresponding to the base node functioning as the central controller is not provided but a plurality of relay nodes are provided in such a manner that each contiguous two of the relay nodes are placed with their communication areas overlapping partially with each other so that communication paths extend reticulately. With the mesh network, the following advantages can be obtained. For example, when a certain one of the relay nodes provided in the mesh network is put in a condition for interrupting communication, the communication is rapidly revived through another relay node provided in the mesh network. In addition, it is easy to add a new relay node to the network.

With regard to the mesh network as mentioned above, various technical improvements have been proposed. For example, with one of such technical improvements, a communication signal which is received and transmitted by each of the relay nodes provided in the mesh network is changed in its signal characteristics, such as a rate of signal, a manner of modulation, a frequency band and so on, in response to the signal receiving capacity of the relay node so that the amount of information processed in a predetermined time in the mesh network is increased (as disclosed in, for example, patent document 1). Further, with another technical improvement, each of the relay nodes constituting the mesh network is provided with a directive antenna system and the directivity of antenna determined by the directive antenna system is selected in response to the communication carried out through the subject relay node so that the communication efficiency in the mesh network is improved (as disclosed in, for example, patent document 2).

The patent document 1: U.S. Pat. No. 6,480,497
The patent document 2: U.S. Pat. No. 6,640,087

DISCLOSURE OF THE INVENTION

Problems Intended to be Solved by the Invention

In the mesh network, there are also several problems apart from the above mentioned advantages. For example, channel information which is information of communication path from a transmitting communication terminal through the mesh network to a receiving communication terminal is frequently interchanged between each contiguous two of the relay nodes constituting the mesh network and thereby the traffic of adjunctive information other than the traffic of essential communication information increases undesirably so as to lower the communication efficiency in the mesh network. In addition, in proportion as the number of the relay nodes constituting the mesh network increases, network control information about positions of the relay nodes, a linking condition among the relay nodes and so on is frequently communicated between each contiguous two of the relay nodes constituting the mesh network and thereby the amount of date of the network control information increases undesirably so that the mesh network is made unstable.

Since the mesh network is practically constituted with the relay nodes, in the last analysis, the above mentioned problems brought about in the mesh network result from a function which each of the relay nodes constituting the mesh network has to be fulfilled.

Accordingly, it is an object of the present invention to provide a communication apparatus which can be applied to constitute each of relay nodes provided to constitute a novel communication network, with which advantages exceeding the advantages obtained with the known mesh network are obtained, and which avoids the problem that the traffic of adjunctive information other than the traffic of essential communication information increases undesirably so that communication efficiency in the communication network is lowered, the problem that the amount of date of the network control information increases undesirably so that the communication network is made unstable, and so on.

Approach to Solve the Problems

According to the invention claimed in any one of claims 1 to 9 of this application, there is provided a communication apparatus comprising a signal receiving portion operative to receive an arriving communication signal for obtaining an input information signal; a framed data processing portion operative to store framed data containing an additional header segment in first memory means, said framed data forming a data frame comprising a frame header segment wherein identification information based on the input information signal is provided and an information segment wherein communication information is provided, and further operative to take out information provided in the additional header segment and the frame header segment of the framed data stored in the first memory means to form header data and then to transmit the header data through a data transmission path; a header data treating portion operative to store the header data transmitted through the data transmission path in second memory means and further to take out the header data stored in the second memory means; a history data treating portion operative, as occasion demands, to preserve the header data taken out from the second memory means as history data in third memory means; first managing means for controlling operations of the header data treating portion and the history data treating portion to make a comparison between the header data taken out from the second memory means and the history data preserved in the third memory means, processing the header data stored in the second memory means in response to a result of the comparison to obtain a processed header data, and transmitting the processed header data through the data transmission path to the framed data processing portion; second managing means for controlling operations of the framed data processing portion so that the identification information provided in the frame header segment of the framed data stored in the first memory means is subjected to a change brought about in response to the processed header data transmitted to the framed data processing portion and the framed data having been subjected to the change in the identification information are segmented to produce an output information signal; and a signal transmitting portion operative to transmit an output communication signal based on the output information signal.

Especially, in one embodiment of communication apparatus according to the invention claimed in claim 2 of this application, each of the first, second and third memory means is constituted with a ring buffer.

In the communication apparatus according to the present invention thus constituted, the framed data based on the arriving communication signal are stored in the first memory means, which is constituted with, for example, the ring buffer, in the framed data processing portion. In the framed data processing portion, the header data contained in the framed data stored in the first memory means are obtained to be transmitted through the data transmission path and stored in the second memory means, which is constituted with, for example, the ring buffer, in the header date treating portion. Then, in the first managing means, the header data stored in the second memory means and the history data preserved in the third memory means, which is also constituted with, for example, the ring buffer, are subjected to the comparison with each other and the header data stored in the second memory means are preserved as the history data when occasion demands.

Further, in the first managing means, the header data stored in the second memory means are processed in response to the result of the comparison between the header data stored in the second memory means and the history data preserved in the third memory means to produce the processed header date. The processed header data thus obtained are transmitted from the first managing means through the data transmission path to the framed data processing portion. Then, under the operation control by the second managing means, the identification information provided in the frame header segment of the framed data stored in the first memory means is changed in response to the processed header data in the framed data processing portion and the output information signal based on the framed data which have been subjected to the change in the identification information is obtained, so that the output communication signal based on the output information signal is transmitted.

Under such a situation as mentioned above, the identification information provided in the frame header segment of the framed data includes information which represents a transmitting communication terminal and a receiving communication terminal in respect of the arriving communication signal, another communication apparatus by which the arriving communication signal has been relayed immediately before arrival at the signal receiving portion, and so on. The output communication signal contains modified identification information which is produced by changing the identification information contained in the arriving communication signal in response to information represented by the history data preserved in the third memory means in the history data treating portion.

EFFECT AND ADVANTAGES OF THE INVENTION

With the communication apparatus according to the present invention, the arriving communication signal is received and then the identification information which is contained in the received arriving communication signal to accompany with the communication information is compared with the history data previously preserved and changed in response to the result of the comparison with the history data, so that the output communication signal containing the modified identification information in addition to the communication information is produced, as a communication signal based on the arriving communication signal, to be transmitted. Accordingly, a communication network can be constituted with a plurality of communication apparatus according to the present invention which are dispersedly arranged for functioning as relay nodes in such a manner that a communication link is formed between each mutually contiguous two of the communication apparatus. This means that the communication apparatus according to the present invention can be applied to constitute each of the relay nodes provided to constitute the communication network.

In the communication network constituted with the relay nodes arranged dispersedly, each of which is constituted with the communication apparatus according to the present invention, the following advantages exceeding the advantages obtained with the known mesh network can be obtained. That is, when a certain one of the relay nodes in the communication network is put in a nonoperative condition during communication, the communication in the communication network can be carried out through another relay node operating in place of the relay node put in the nonoperative condition without being interrupted. Further, it is very easy to add a new relay node to the communication network. In addition, channel information which is information of communication paths in the communication network from a transmitting communication terminal to a receiving communication terminal is not interchanged frequently between each contiguous two of the relay nodes and therefore the traffic of adjunctive information other than the traffic of essential communication information does not increase so that the communication efficiency in the communication network is not lowered. Besides, network control information about positions of the relay nodes, a linking condition among the relay nodes and so on is not communicated frequently between each contiguous two of the relay nodes even if the number of the relay nodes in the communication network increases and therefore a problem that the amount of data of the network control information increases undesirably so that the communication network is made unstable is not brought about Consequently, with the communication apparatus according to the present invention, the advantages exceeding the advantages obtained with the known mesh network can be obtained, and the communication apparatus according to the present invention can be applied to constitute each of the relay nodes provided to constitute the novel communication network which avoids the problem that the traffic of adjunctive information other than the traffic of essential communication information increases undesirably so that communication efficiency in the communication network is lowered, the problem that the amount of date of the network control information increases undesirably so that the communication network is made unstable, and so on.

DESCRIPTION OF REFERENCES IN THE DRAWINGS

11a~11i . . . relay nodes, 12 . . . interface unit, 13 . . . core unit, 14 . . . main bus, 15 . . . system bus, 21 . . . signal receiving portion, 22 . . . A/D converting and selecting portion, 23 . . . MAC section, 24 . . . SAR portion, 25 . . . framed data processing portion, 26 . . . MAC managing means, 27 . . . selecting and D/A converting portion, 28 . . . signal transmitting portion, 31 . . . core managing means, 32 . . . header data treating portion, 33 . . . history data treating portion, 34 . . . central control portion, 35 . . . data processing portion, 49 . . . reassembling portion, 50 . . . MAC memory means, 52, 83 . . . data transmitting portion, 53, 85 . . . data deleting portion, 54, 81 . . . data taking portion, 55 . . . data transmission control portion, 56 . . . segmenting portion, 71 . . . header data memory means, 72 . . . header data memory control portion, 73 . . . snapshoot memory means, 74 . . . history data memory means, 75 . . . history data preserving memory means, 76 . . . history data memory control portion, 84 . . . data preserving portion

EMBODIMENT MOST PREFERABLE FOR WORKING OF THE INVENTION

An embodiment most preferable for the working of the present invention will be explained below.

Figure 1:
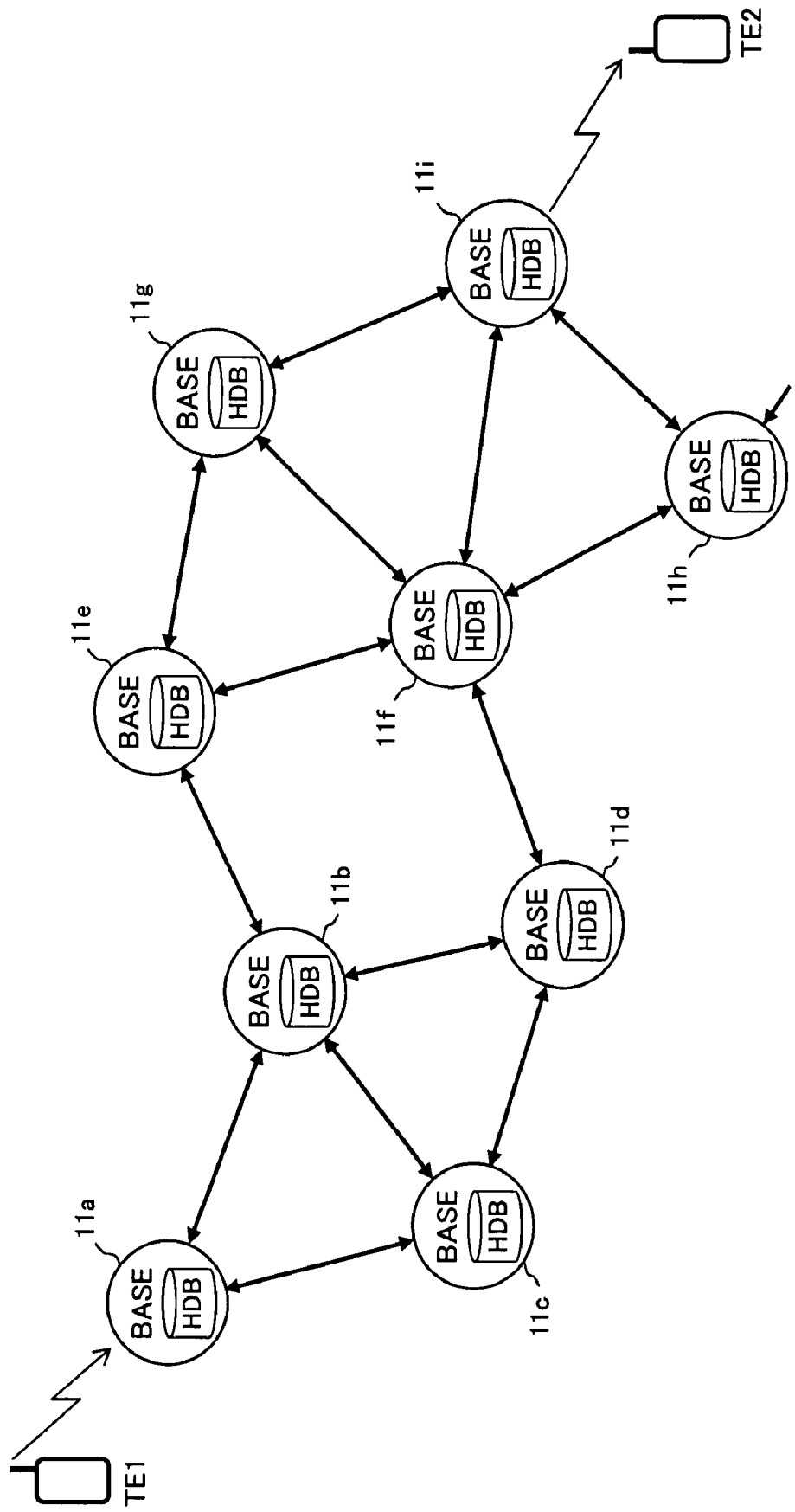
FIG. 1 is a schematic illustration showing an example of a communication network constituted with a plurality of relay nodes, each of which is constituted with an embodiment of communication devise according to the present invention.

FIG. 1 shows an example of a communication network constituted with a plurality of relay nodes, each of which is able to be constituted with a communication devise according to the present invention.

In the communication network shown in FIG. 1, a plurality of relay nodes 11a~11i, each of which is labeled "BASE", are dispersedly arranged in such a manner that each contiguous two of the relay nodes 11a~11i are placed with their communication areas overlapping partially with each other. Two of the relay nodes 11a~11i interconnected with a solid arrow in FIG. 1 are contiguous to each other and operative to communicate mutually. Each of the relay nodes 11a~11i has a history database HDB which is constituted with memory means storing history data related to a communication signal arriving thereat, as explained later.

One or more communication terminals, such as portable telephones, personal computers or the like, are registered at each of the relay nodes 11a~11i or some of the relay nodes 11a~11i to be under the control of the same. Each of the communication terminals is discriminated with identification information of its own.

When an information communication from a communication terminal TE1 under the control of the relay node 11a to another communication terminal TE2 under the control of the relay node 11i is intended to be done, a communication signal destined for the communication terminal TE2 is transmitted from the communication terminal TE1 through a communication path passing in succession, for example, the relay nodes 11a, 11b, 11e, 11f and 11i to the communication terminal ET2. In each of the relay nodes 11a, 11b, 11e, 11f and 11i, various kinds of identification information contained in the communication signal arriving thereat are processed with reference to the history data preserved in the history database HDB and then the arriving communication signal is relayed to another of the relay nodes 11a, 11b, 11e, 11f and 11i or the communication terminal ET 2.

Embodiment

Figure 2:
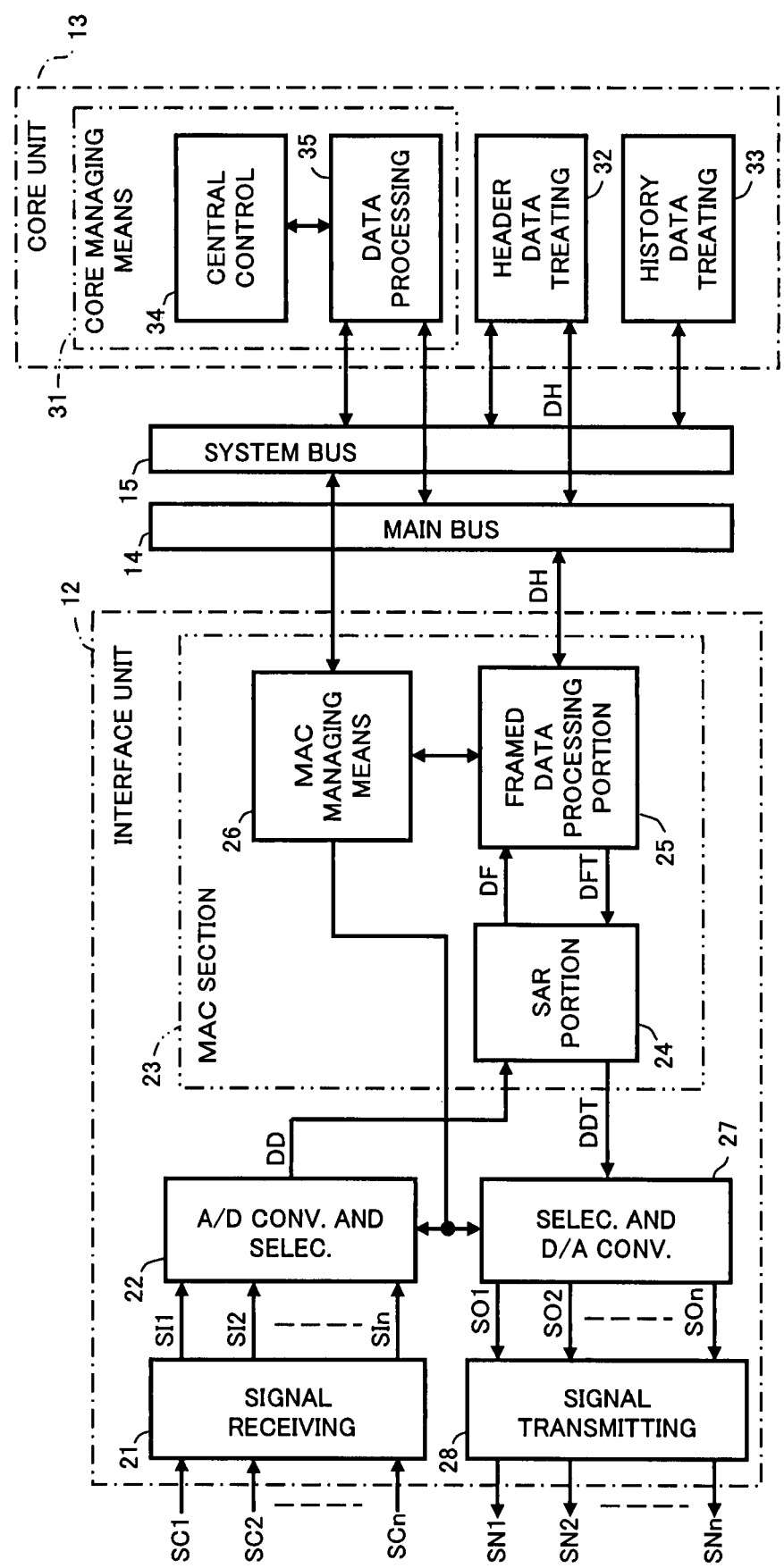
FIG. 2 is a schematic block diagram showing the embodiment of communication apparatus according to the present invention.

FIG. 2 shows an embodiment of communication apparatus according to the present invention, which can be applied to constitute each of the relay nodes 11a~11i shown in FIG. 1.

The embodiment shown in FIG. 2 comprises an interface unit 12, a core unit 13, a main bus 14 and a system bus 15. The interface unit 12 is connected through the main bus 14 and the system bus 15 with the core unit 13. In the interface unit 12, a signal receiving portion 21 is operative to receive arriving communication signals SC1~SCn (n is a positive integer), each of which arrives at the interface unit 12 from the outside, to produce input information signals SI1~SIn which correspond to the arriving communication signals SC1~SCn, respectively. The input information signals SI1~SIn are supplied to an analog to digital (A/D) converting and selecting portion 22 containing a plurality of A/D converters. In the A/D converting and selecting portion 22, the input information signals SI1~SIn are subjected to A/D conversion in the A/D converters, respectively, so as to produce n input information digital signals and one of n input information digital signals is selected to be input digital data DD. The input digital data DD thus obtained are forwarded to a media access control (MAC) section 23.

In the MAC section 23, the input digital data DD obtained from the A/D converting and selecting portion 22 are supplied to a segmenting and reassembling (SAR) portion 24 which is operative to segment framed data to produce segmented data and to reassemble segmented data to produce framed data. In the SAR portion 24, the input digital data DD is subjected to reassembling process to produce framed data DF based on a selected one of the input information signals SI1~SIn obtained from the signal receiving portion 21. The framed data DF forms a data frame containing a frame header segment and an information segment successive to the frame header segment. In the frame header segment in the data frame of the framed data DF, various kinds of identification information are provided. Such kinds of identification information include information representing a transmitting communication terminal in respect of the selected one of the input information signals SI1~SIn obtained from the signal receiving portion 21, information representing a receiving communication terminal in respect of the arriving communication signal, information representing other communication apparatus by each of which the arriving communication signal has been relayed before arrival at the signal receiving portion 21, and so on. Further, in the information segment in the data frame of the framed data DF, communication information transmitted by the selected one of the input information signals SI1~SIn is provided. The framed data DF thus produced is supplied to a framed data processing portion 25.

The framed data processing portion 25 is operative under the management and control by MAC managing means 26 to store the framed data DF obtained from the SAR portion 24 at a predetermined address in memory means built in the framed data processing portion 25 and to add a Base header segment to the data frame of the framed data DF as an additional header segment preceding the frame header segment, for example. In the Base header segment, various kinds of Base information, such as time information representing a time point at which the framed data DF arrived at the framed data processing portion 25, information of number of times representing the number of arrival times of the framed data DF at the framed data processing portion 25, and so on, are provided.

When the framed data DF stored in the memory means built in the framed data processing portion 25 are unnecessary for a relay node which the embodiment shown in FIG. 2 constitutes, the MAC managing means 26 makes a decision of unnecessariness. A sending out flag is added to the Base header segment of the data frame of the framed data DF which are decided to be unnecessary by the MAC managing means 26. The sending out flag indicates that the framed data DF are to be sent out to other relay nodes as it is. Then, in the framed data processing portion 25, the frame header segment and the information segment other than the additional header segment are extracted from the data frame of the framed data DF which are decided to be unnecessary by the MAC managing means 26 to form framed data DFT for discharge. The framed data DFT for discharge are supplied to the SAR portion 24. The Base header segment of the data frame of the framed data DF which are decided to be unnecessary by the MAC managing means 26 is deleted in the framed data processing portion 25.

In the SAR portion 24 supplied with the framed data DFT for discharge from the framed data processing portion 25, the framed data DFT for discharge are subjected to segmenting process by which a data frame of the framed data DFT for discharge is segmented so as to produce output digital data DDT. The output digital data DDT thus produced are forwarded to a selecting and digital to analog (D/A) converting portion 27 containing a plurality of D/A converters. In the selecting and D/A converting portion 27, the output digital data DDT are subjected to D/A conversion in one of the D/A converters selected by the selecting and D/A converting portion 27 to produce one of output information signals S01~S0n to be supplied to a signal transmitting portion 28. The signal transmitting portion 28 is operative to transmit one of output communication signals SN1~SNn which is based on the selected one of output information signals S01~S0n. In the operation mentioned above, the selected one of the input information signals SI1~SIn, which is based on the arriving communication signals SC1~SCn received by the signal receiving portion 21, bypasses the core unit 13 so as to be transformed, without concerning itself in the core unit 13, into the selected one of the output information signals S01~S0n to be transmitted in the form of one of output communication signals SN1~SNn from the signal transmitting portion 28 to other relay nodes. This operation is called as a bypass-transmitting operation.

The operation for selecting one of n input information digital signals based on the input information signals SI1~SIn to be the input digital data DD in the A/D converting and selecting portion 22 and the operation for selecting one of the D/A converters in the selecting and D/A converting portion 27 are carried out under the control by the MAC managing means 26 in the MAC section 23.

On the other hand, when the framed data DF stored in the memory means built in the framed data processing portion 25 are necessary for the relay node which has the MAC section 23 containing the framed data processing portion 25, the MAC managing means 26 makes a decision of necessariness. Then, in the framed data processing portion 25, the Base header segment and the frame header segment are extracted from the data frame of the data frame of the framed data DF which are decided to be necessary by the MAC managing means 26 to produce header data DH which forms a data frame containing the Base header segment and the frame header segment thus extracted. The header data DH are transmitted from the interface unit 12 through the main bus 14 to the core unit 13.

The core unit 13 comprises core managing means 31, a header data treating portion 32 and a history data treating portion 33. The core managing means 31 contains a central control portion 34 and a data processing portion 35 for processing data supplied thereto under the control by the central control portion 34. The data processing portion 35, the header data treating portion 32 and the history data treating portion 33 in the core managing means 31 are interconnected through the system bus 15 with one another. The core managing means 31 is operative to control operations of the header data treating portion 32 and the history data treating portion 33. Each of the data processing portion 35 and the header data treating portion 32 in the core managing unit 31 is connected with the main bus 14.

In the core unit 13, the header data DH which forms the data frame containing the Base header segment and the frame header segment transmitted through the main bus 14 are supplied to the header data treating portion 32. The header data treating portion 32 is operative to store the header data DH at a predetermined address in memory means built in the header data treating portion 32 under the control by the core managing means 31.

The header data treating portion 32 is further operative to take out the header data DH stored in the memory means built in the header data treating portion 32 from the memory means, as occasion demands, in accordance with the control by the core managing means 31. The header data DH obtained from the header data treating portion 32 are supplied through the system bus 15 to the history data treating portion 33. In the history data treating portion 33, a history database has been constituted with memory means built in the history data treating portion 33 in which header data transmitted to the core managing means 31 have been stored as history data. The history data treating portion 33 is operative to preserve, as new history data, the header data DH taken out from the memory means which is built in the header data treating portion 32 in the memory means which is built in the history data treating portion 33 for constituting the history database, as occasion demands, in accordance with the control by the core managing means 31, so that the history database is enlarged.

Further, in the core managing means 31, the data processing portion 35 is operative, under the control by the central control portion 34, to make a comparison between the header data DH taken out from the memory means built in the header data treating portion 32 and the history data preserved in the memory means built in the history data treating portion 33 for constituting the history database. The data processing portion 35 is further operative to decide, in response to a result of the comparison, for example, whether a transmitting communication terminal related to the input information signal from which the header data DH are obtained is under the control by the relay node constituted with the embodiment containing the data processing portion 35 or not, whether a destined receiving communication terminal related to the input information signal from which the header data DH are obtained is under the control by the relay node constituted with the embodiment containing the data processing portion 35 or not, whether the input information signal from which the header data DH are obtained had arrived at the embodiment containing the data processing portion 35 or not, and so on. Then, in the data processing portion 35, the header data DH is subjected to flagging process by which a flag responding to the decision made by the data processing portion 35 is added to the header data DH. The header data DH having been processed are transmitted through the main bus 14 to the framed data processing portion 25 contained in the MAC section 23 of the interface unit 12.

In the framed data processing portion 25 to which the header data DH having been processed are supplied from the core unit 13, the identification information provided in the frame header segment of the data frame of the framed data DF stored in the memory means built in the framed data processing portion 25 is subjected to a change brought about in response to the flag contained in the header data DH having been processed to be supplemented or modified under the control by the MAC managing means 26. Further, in the framed data processing portion 25, the framed data DF forming the data frame constituted with the frame header segment in which the identification information having been subjected to the changed and the information segment successive to the frame header segment are taken out from the memory means built in the framed data processing portion 25 to produce framed data DFT for transmission. The framed data DFT for transmission are supplied to the SAR portion 24. The Base header segment of the data frame of the framed data DF remaining in the memory means built in the framed data processing portion 25 is deleted in the framed data processing portion 25.

In the SAR portion 24, the framed data DFT for transmission thus obtained from the framed data processing portion 25 are subjected to segmenting process by which a data frame of the framed data DFT for transmission is segmented so as to produce output digital data DDT. The output digital data DDT thus produced are forwarded to the selecting and D/A converting portion 27. In the selecting and D/A converting portion 27, the output digital data DDT are subjected to D/A conversion in one of the D/A converters selected by the selecting and D/A converting portion 27 to produce one of output information signals S01~S0n to be supplied to the signal transmitting portion 28. The signal transmitting portion 28 is operative to transmit one of output communication signals SN1~SNn which is based on the selected one of output information signals S01~S0n.

Figure 3:
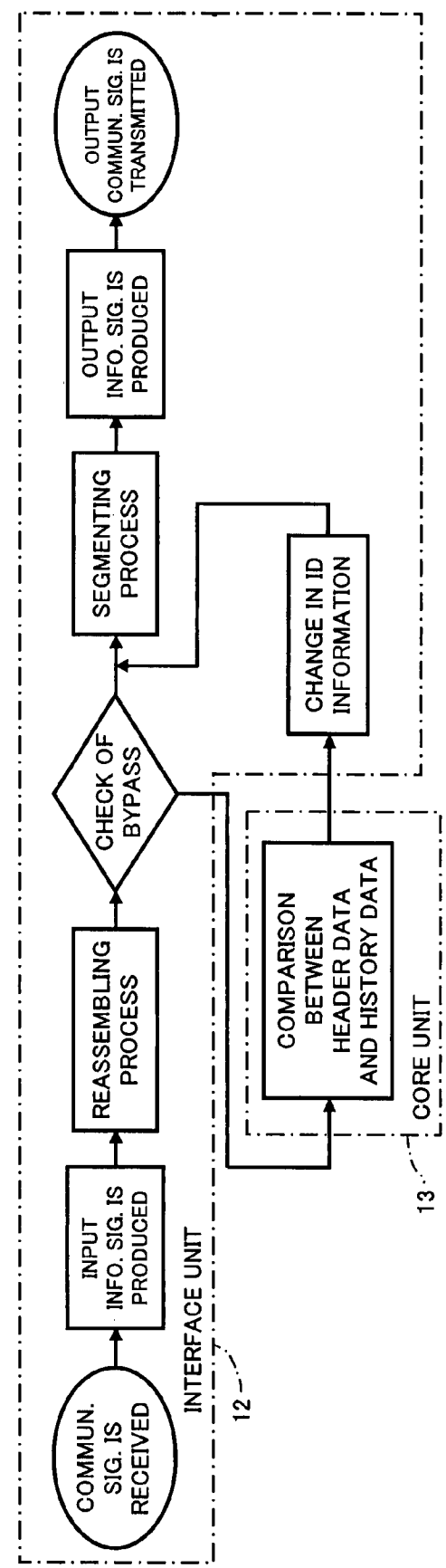
FIG. 3 is a schematic illustration showing briefly essential elements of operations carried out in the embodiment shown in FIG. 2.

FIG. 3 shows essential conceptive elements of the above described operations carried out in the embodiment shown in FIG. 2. Referring to FIG. 3, in the interface unit 12, first, the communication signal coming from the outside is received to produce the input information signal corresponding to the communication signal. The input information signal is subjected to the reassembling process for producing the framed data which is stored in the memory means and to which the additional header information is added.

Then, it is checked whether the framed data are unnecessary for the relay node constituted with the embodiment shown in FIG. 2 and therefore to be subjected to the bypass transmitting operation to be transmitted as it is to other relay nodes or not. When it is decided that the framed data are to be subjected to the bypass transmitting operation, the framed data are subjected to segmenting process for producing the output information signal and the output communication signal based on the output information signal is transmitted. On the other hand, when it is decided that the framed data are not to be subjected to the bypass transmitting operation, the header data contained in the framed data are transmitted from the interface unit 12 to the core unit 13.

In the core unit 13, the header data transmitted from the interface unit 12 are subjected to the comparison with the history date preserved in the history database constituted in the core unit 13 and further subjected to the flagging process by which the flag responding to the result of the comparison is added to the header data. The header data having been subjected to the flagging process are transmitted from the core unit 13 to the interface unit 12. In the interface unit 12, the identification information contained in the framed data stored in the memory means in the interface unit 12 is changed in response to the flag contained in the header data having been subjected to the flagging process and transmitted from the core unit 13. Then, the framed data in which the identification information has been changed are subjected to the segmenting process for producing the output information signal and the output communication signal based on the output information signal is transmitted.

When a plurality of relay nodes, each of which is constituted with the embodiment shown in FIG. 2, are dispersedly arranged in such a manner that each contiguous two of the relay nodes are placed with their communication areas overlapping partially with each other, a communication network, such as one constituted with the relay nodes 11a~11i as shown in FIG. 1, is constituted. With the communication network thus constituted, the following advantages are obtained. That is, when a certain one of the relay nodes in the communication network is put in a nonoperative condition during communication, the communication in the communication network can be carried out through another relay node operating in place of the relay node put in the nonoperative condition without being interrupted. Further, it is very easy to add a new relay node to the communication network. In addition, channel information which is information of communication paths in the communication network from a transmitting communication terminal to a receiving communication terminal is not interchanged frequently between each contiguous two of the relay nodes and therefore the traffic of adjunctive information other than the traffic of essential communication information does not increase so that the communication efficiency in the communication network is not lowered. Besides, network control information about positions of the relay nodes, a linking condition among the relay nodes and so on is not communicated frequently between each contiguous two of the relay nodes even if the number of the relay nodes in the communication network increases and therefore a problem that the amount of data of the network control information increases undesirably so that the communication network is made unstable is not brought about.

Figure 4:
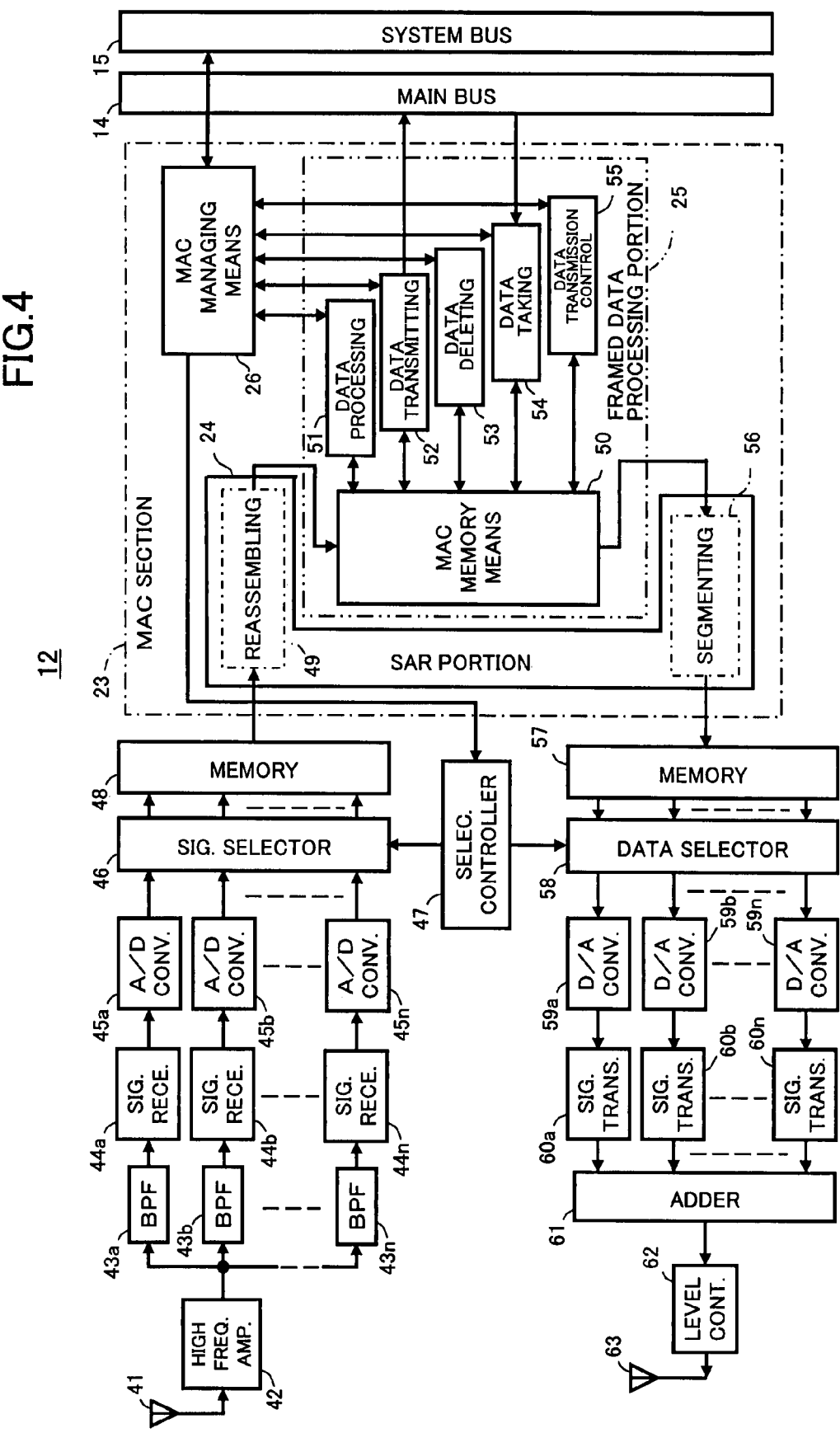
FIG. 4 is a schematic block diagram showing a concrete example of an interface unit of the embodiment shown in FIG. 2.

FIG. 4 shows a concrete example of the interface unit 12 shown in FIG. 2.

In the concrete example shown in FIG. 4, communication signals coming from the outside, such as the arriving communication signals SC1~SCn, are supplied through a receiving antenna 41 to a high frequency amplifier 42. Each of the communication signals amplified by the high frequency amplifier 42 is supplied through one of band pass filter (BPF) 43a~43n, which corresponds to a carrier frequency of the communication signal, to one of signal receivers 44a~44n. In each of the signal receivers 44a~44n, the communication signal having passed one of the BPF 43a~43n is subjected successively to frequency conversion, level control, signal demodulation and so on to produce an input information signal based on the communication signal. Accordingly, the receiving antenna 41, the high frequency amplifier 42, the BPF 43a~43n and the signal receivers 44a~44n comprise the signal receiving portion 21 shown in FIG. 2.

The input information signals obtained from the signal receivers 44a~44n are supplied to A/D converters 45a~45n, respectively. In each of the A/D converters 45a~45n, the input information signal from one of the signal receivers 44a~44n is subjected to A/D conversion by which the input information signal is digitalized to produce an input information digital signal. The input information digital signals are supplied to a signal selector 46. Therefore, the A/D converters 45a~45n constitute the digital signal generating portion for producing the input information digital signals based on the input information digitals.

In the signal selector 46, one of the input information digital signals from the A/D converters 45a~45n is selected to produce input digital date, such as the input digital date DD shown in FIG. 2, for example, and supplied to a memory 48 under the control by a selection controller 47 which operates under the control by the MAC managing means 26 in the MAC section 23. The input digital data are written in and read from the memory 48 under the control by the MAC managing means 26 in the MAC section 23. The input digital data read from the memory 48 are supplied to the SAR portion 24 in the MAC section 23. Accordingly, the A/D converters 45a~45n, the signal selector 46, the selection controller 47 and the memory 48 constitute the A/D converting and selecting portion 22 shown in FIG. 2.

Figure 5:
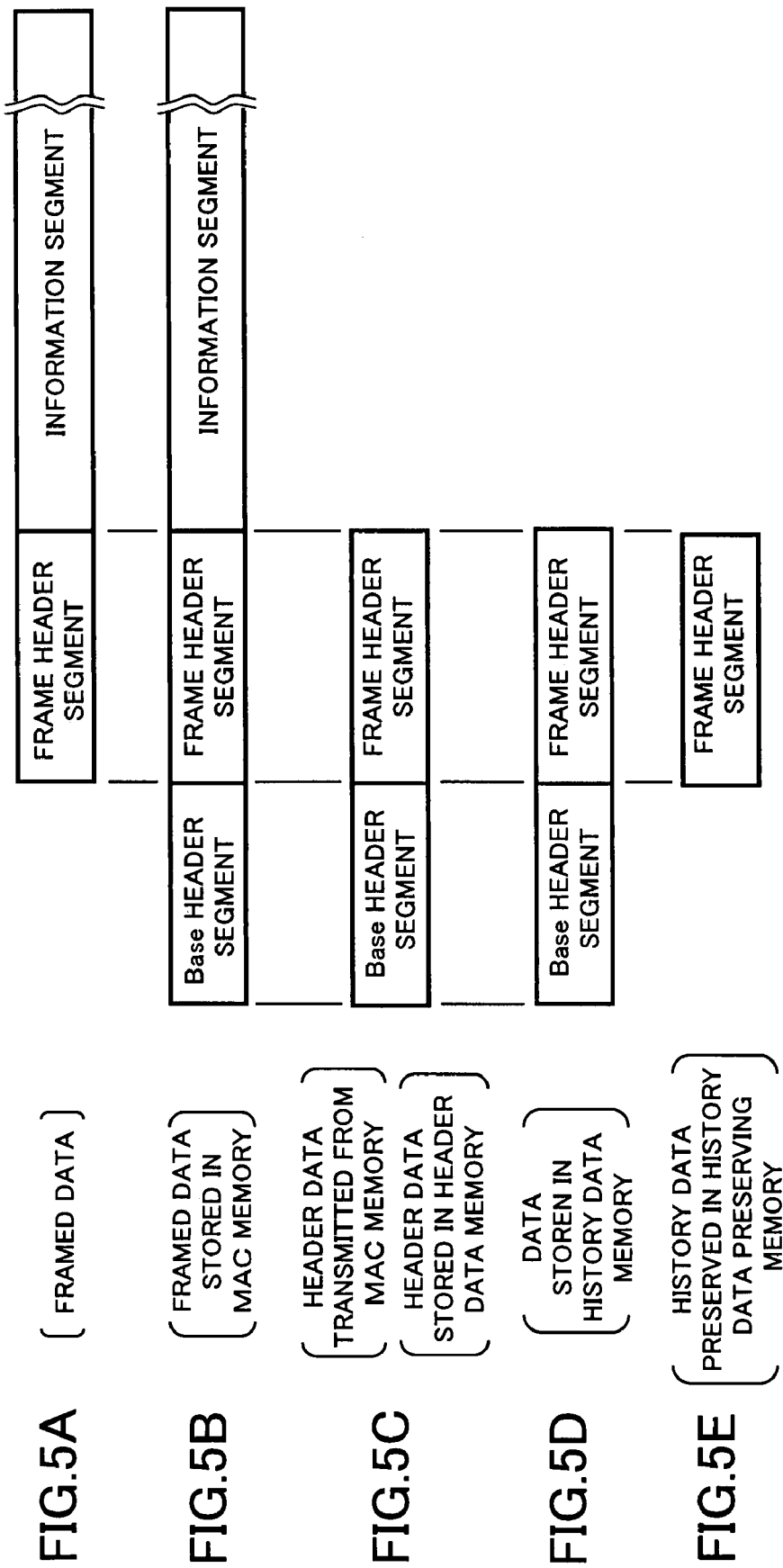
FIGS. 5A to 5E are schematic illustrations showing examples of data formats each representing an allocation of framed data or header data obtained in the embodiment shown in FIG. 2.

In the SAR portion 24 in the MAC section 23, the input digital data read from the memory 48 are subjected to the reassembling process by a reassembling portion 49 for producing framed data based on a selected one of the input information signals obtained from the signal receivers 44a~44n. The framed data forms a data frame containing a frame header segment and an information segment successive to the frame header segment, as shown in FIG. 5A, for example. The framed data thus produced are supplied to the framed data processing portion 25.

In the framed data processing portion 25, the framed data obtained from the reassembling portion 49 in the SAR portion 24 are stored in MAC memory means 50. The MAC memory means 50 is constituted with, for example, a ring buffer, and operations for storing data in or taking out data from the MAC memory means 50 are control led by a data processing portion 51, a data transmitting portion 52, a data deleting portion 53, a data taking portion 54 and a data transmission control portion 55, each of which is under the control by the MAC managing means 26.

In the frame header segment of the data frame of the framed data stored in the MAC memory means 50, various kinds of identification information representing a transmitting communication terminal in respect of the selected one of the input information signals obtained from the signal receivers 44a~44n, a receiving communication terminal in respect of the selected one of the input information signals, other relay nodes which the selected one of the input information signals has passed, and so on, are provided. Further, in the information segment of the data frame of the framed data stored in the MAC memory means 50, communication information which is transferred by the selected one of the input information signals obtained from the signal receivers 44a~44n is provided.

In the framed data processing portion 25, a Base header segment is added to the data frame of the framed data stored in the MAC memory means 50 as an additional header segment preceding the frame header segment, for example, by the data processing portion 51. In the Base header segment, various kinds of Base information, such as time information representing a time point at which the framed data arrived at the framed data processing portion 25, information of number of times representing the number of arrival times of the framed data at the framed data processing portion 25, and so on, are provided. Accordingly, the framed data stored in the MAC memory means 50 forms a data frame containing the Base header segment, the frame header segment and the information segment, as shown in FIG. 5B, for example.

Under a situation where the framed data are stored in the MAC memory means 50 as described above, in the MAC section 23, when the framed data stored in the MAC memory means 50 are unnecessary for the relay node which contains the MAC section 23, the MAC managing means 26, which is informed of the condition of the framed data through the data processing portion 51, makes a decision of unnecessariness. A sending out flag is added to the Base header segment of the data frame of the framed data which are decided to be unnecessary by the MAC managing means 26. The sending out flag indicates that the framed data, to which the sending out flag is added, are to be sent out to other relay nodes as it is. Then, the frame header segment and the information segment other than the additional header segment are extracted from the data frame of the framed data, to which the sending out flag is added, to form framed data for discharge to be transmitted to the SAR portion 24 by the data transmission control portion 55. The additional header segment of the data frame of the framed data, to which the sending out flag is added, is deleted by the data deleting portion 53.

In the SAR portion 24 supplied with the framed data for discharge from the MAC memory means 50, the framed data for discharge are subjected to segmenting process by a segmenting portion 56 to produce output digital data based on the framed data for discharge. The output digital data thus produced are forwarded from the MAC section 23 to a memory 57 to be written in and read from the memory 57, for example, under the control by the MAC managing means 26 in the MAC section 23. The output digital data read from the memory 57 are supplied to a data selector 58.

The output digital data supplied to the data selector 58 are further supplied to one of D/A converters 59a~59n, which is selected by the data selector 58. In the selected one of D/A converters 59a~59n, the output digital data are subjected to A/D conversion by which the output digital data are analogized to produce an output information signal. The output information signal thus obtained is supplied to one of signal transmitters 60a~60n connected with the selected one of D/A converters 59a~59n. The D/A converters 59a~59n constitute an analog signal generating portion for producing the output information signal based on the output digital data and the memory 57, the data selector 58 and the D/A converters 59a~59n constitute the selecting and D/A converting portion 27 shown in FIG. 2.

In said one of signal transmitters 60a~60n, the output information signal is subjected to signal modulation in which the output information signal acts as modulating signal, frequency band control in which a frequency band of a demodulated signal obtained by the signal modulation is control led, and so on, to produce an output communication signal. The output communication signal is supplied through an adder 61 to a level controller 62. A level of the output communication signal is so control led as not to exceed a predetermined level in the level controller 62 and the output communication signal having the level thus controlled is transmitted through a transmitting antenna 63, for example, as one of the output communication signals SN1~SNn. Accordingly, the signal transmitters 60a~60n, the level controller 62 and the transmitting antenna 63 constitute the signal transmitting portion 28 shown in FIG. 2.

On the other hand, when it is decided by the MAC managing means 26 that the framed data stored in the MAC memory means 50 are necessary for the relay node which contains the MAC section 23, various kinds of identification information provided in the Base header segment and the frame header segment of the data frame of the framed data stored in the MAC memory means 50 are taken out in duplicate from the MAC memory means 50 by the data transmitting portion 52 in the framed data processing portion 25. Then, an address pointer is added to the Base header segment and the frame header segment taken out from the MAC memory means 50 to produce header data forming a data frame containing the Base header segment and the frame header segment as shown in FIG. 5C, for example, by the data transmitting portion 52 and the header data thus obtained from the framed data processing portion 25 are transmitted from the interface unit 12 through the main bus 14 to the core unit 13 by the data transmitting portion 52. In such a manner as mentioned above, the header data transmitted from the interface unit 12 to the core unit 13 do not contain any information segment but contain only the Base header segment and the frame header segment of the data frame of the framed data stored in the MAC memory means 50.

Further, in the framed data processing portion 25, when the header data having been subjected to the flagging process are transmitted through the main bus 14 from the core unit 13, the header data having been subjected to the flagging process are stored in the MAC memory means 50. Then, the identification information provided in the frame header segment of the data frame, such as shown in FIG. 5B, of the framed data stored in the MAC memory means 50 are supplemented or modified in response to the flag contained in the header data having been subjected to the flagging process. After that, the framed data forming the data frame which contains the frame header segment wherein the identification information supplemented or modified in such a manner as mentioned above and the information segment are taken out from the MAC memory means 50 to be transmitted, as framed data for transmission, from the framed data processing portion 25 to the SAR portion 24 by the data transmission control portion 55. The additional header segment of the data frame of the framed data and the header data having been subjected to the flagging process remaining in the MAC memory means 50 are deleted by the data deleting portion 53.

In the SAR portion 24, the framed data for transmission transmitted from the framed data processing portion 25 to the SAR portion 24 as described above are also subjected to segmenting process by the segmenting portion 56 to produce output digital data based on the framed data for transmission. The output digital data thus produced are forwarded from the MAC section 23 to the memory 57 to be written in and read from the memory 57. The output digital data read from the memory 57 are supplied to the data selector 58. Then, the output digital data supplied to the data selector 58 are further supplied to one of D/A converters 59a~59n, which is selected by the data selector 58. In the selected one of D/A converters 59a~59n, an output information signal based on the output digital data is produced to be supplied to one of signal transmitters 60a~60n connected with the selected one of D/A converters 59a~59n.

In said one of signal transmitters 60a~60n, an output communication signal based on the output information signal is produced to be supplied through an adder 61 to the level controller 62. The output communication signal is controlled in its level by the level controller 62 and then transmitted through the transmitting antenna 63, for example, as one of the output communication signals SN1~SNn.

Figure 6:
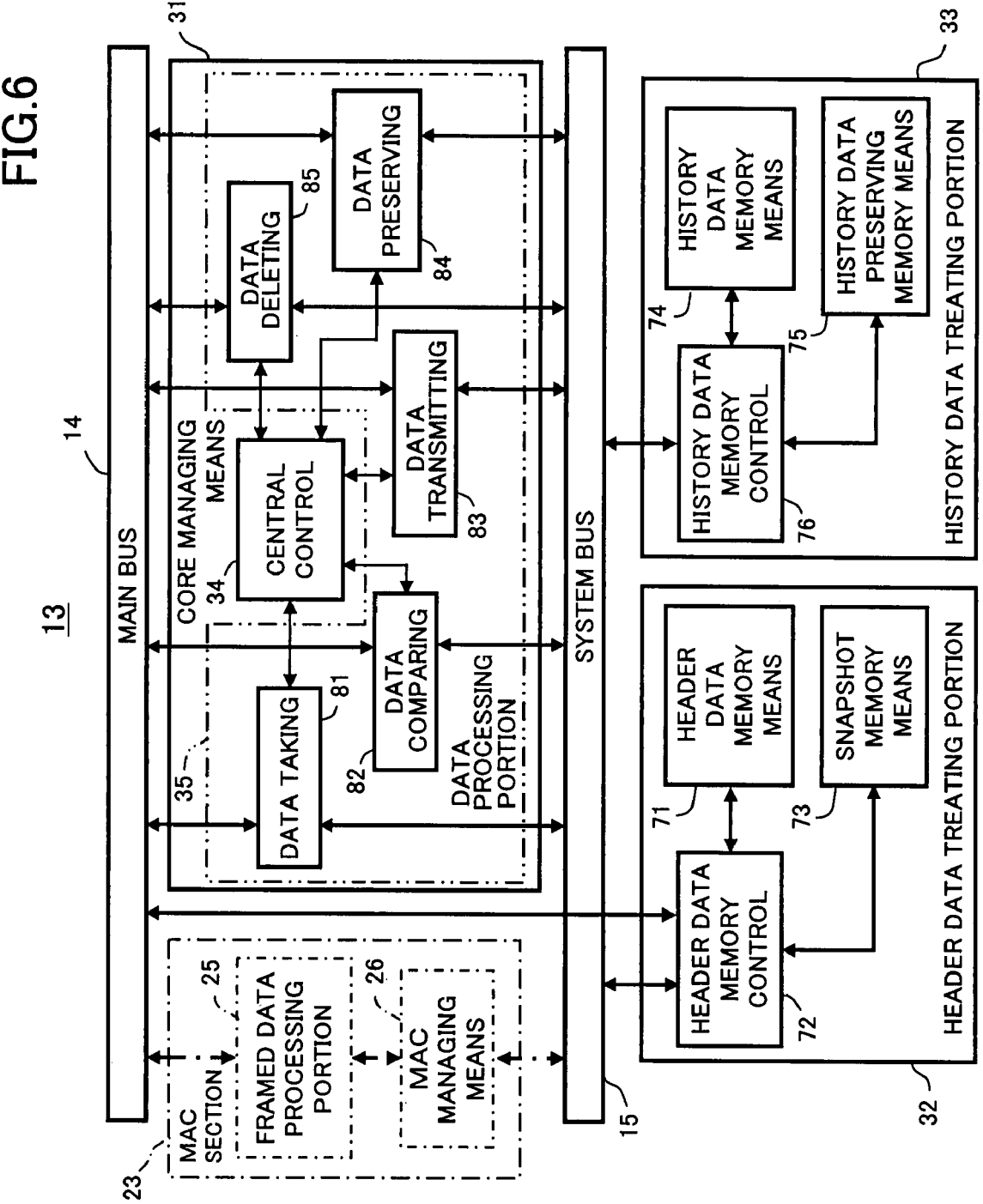
FIG. 6 is a schematic block diagram showing a concrete example of a core unit of the embodiment shown in FIG. 2.

FIG. 6 shows a concrete example of the core unit 13 shown in FIG. 2.

In the concrete example shown in FIG. 6, header date transmitted through the main bus 14 from the MAC section 23 of the interface unit 12 are supplied through the system bus 15 to the header data treating portion 32 which is connected through the system bus 15 with the history data treating portion 33.

The header data treating portion 32 comprises header date memory means 71 for storing the header data therein, a header data memory control portion 72 operative to control writing and reading of the header data in and from the header date memory means 71 under the control by the data processing portion 35 in the core managing means 31, and snapshot memory means 73 for backing up transitorily the header data handled by the header date memory means 71. The header date memory means 71 is constituted with, for example, a ring buffer. The history data treating portion 33 comprises history data memory means 74 for storing the history data temporarily therein, history data preserving memory means 75 for preserving the history data therein to form a history database, and a history data memory control portion 76 operative to control writing and reading of the history data in and from the history date memory means 74 and preservation of the history data in the history data preserving memory means 75 under the control by the data processing portion 35 in the core managing means 31. Each of the history data memory means 74 and the history data preserving memory means 75 is also constituted with for example, a ring buffer.

In such a situation as described above, in the header date treating portion 32, the header data coming through the main bus 14 from the MAC section 23 of the interface unit 12 are stored through the header data memory control portion 72 in the header data memory means 71. The header data stored in the header data memory means 71 forms the data frame containing the Base header segment and the frame header segment, as shown in FIG. 5C, for example.

The frame header segment of the data frame of the header data thus stored in the header data memory means 71 is read from the header data memory means 71, as occasion demands, to produce history data to be stored through the system bus 15 temporarily in the history data memory means 74 under the control by the data processing portion 35 in the core managing means 31. Then, the history data thus stored temporarily in the history data memory means 74 are preserved in the history data preserving memory means 75 to be added to the history database.

The data processing portion 35 in the core managing means 31 comprises a data taking portion 81, a data comparing portion 82, a data transmitting portion 83, a data preserving portion 84 and a data deleting portion 85, each of which are connected with the main bus 14 and the system bus 15 and operates under the control by the central control portion 34.

The data taking portion 81 is operative to cause the header data memory control portion 72 in the header data treating portion 32 to write the header data, which is transmitted from the MAC section 23 of the interface unit 12 through the main bus 14 to the header data treating portion 32, in the header data memory means 71 so that the header data is stored in the header data memory means 71.

The data comparing portion 82 is operative to cause further the header data memory control portion 72 to make a comparison between the header data stored in the header data memory means 71 in the header data treating portion 32 and the history data preserved in the header data preserving memory means 75 in the history data treating portion 33, and to decide, in response to a result of the comparison between the header data stored in the header data memory means 71 and the history data preserved in the header data preserving memory means 75, for example, whether a transmitting communication terminal related to an input information signal from which the header data are obtained in the interface unit 12 is under the control by the relay node constituted with the communication apparatus having the interface unit 12 or not, whether a destined receiving communication terminal related to the input information signal from which the header data are obtained in the interface unit 12 is under the control by the relay node constituted with the communication apparatus having the interface unit 12 or not, whether the input information signal from which the header data are obtained in the interface unit 12 had arrived at the communication apparatus having the interface unit 12 or not, and so on. Then, with the operation of the data comparing portion 82, the header data stored in the header data memory means 71 are subjected to flagging process by which a flag responding to the decision made by the data comparing portion 82 is added to the header data.

The data transmitting portion 83 is operative to cause the header data memory control portion 72 in the header data treating portion 32 to read the header data, which has been subjected to the flagging process and thereby containing the flag therein, from the header data memory means 71 and to transmit the header data having been subjected to the flagging process through the main bus 14 to the framed data processing portion 25 in the MAC section 23 of the interface unit 12.

The data preserving portion 84 is operative to cause the history data memory control portion 76 to make a comparison between the header data stored in the header data memory means 71 in the header data treating portion 32 and the history data preserved in the header data preserving memory means 75 in the history data treating portion 33, and to decide, in response to a result of the comparison between the header data stored in the header data memory means 71 and the history data preserved in the history data preserving memory means 75, whether the header data stored in the header data memory means 71 contain the frame header segment which are to be preserved as new history data in the history data preserving memory means 75 or not.

When it is decided that the header data stored in the header data memory means 71 contain the frame header segment which are to be preserved as new history data in the history data preserving memory means 75, the data preserving portion 84 is operative to cause the header data memory control portion 72 in the header data treating portion 32 to read the Base header segment and the frame header segment contained in the header data stored from the header data memory means 71 and to transmit data forming a data frame containing the Base header segment and the frame header segment through the system bus to the history data treating portion 33. The data preserving portion 84 is further operative to cause the history data memory control portion 76 in the history data treating portion 33 to write the data forming the data frame containing the Base header segment and the frame header segment, as shown in FIG. 5D, which are transmitted to the history data treating portion 33, in the history data memory means 74 so that the data forming the data frame containing the Base header segment and the frame header segment are stored temporarily in the history data memory means 74, and then, to preserve the frame header segment of the data frame of the data stored temporarily in the history data memory means 74 in the history data preserving memory means 75. As a result, the frame header segment as shown in FIG. 5E, for example, is preserved as a new history data in the history data preserving memory means 75 to be added to the history database.

The data deleting portion 85 is operative to delete various data having been disused in the core unit 13, such as the header data containing the Base header segment remaining in the header data treating portion 32.

APPLICABILITY FOR INDUSTRIAL USE

As apparent from the above description, the communication apparatus can be applied to constitute each of relay nodes provided to constitute a novel communication network, with which advantages exceeding the advantages obtained with the known mesh network are obtained, and which avoids the problem that the traffic of adjunctive information other than the traffic of essential communication information increases undesirably so as to lower the communication efficiency in the communication network, the problem that the amount of date of the network control information increases undesirably so that the communication network is made unstable, and so on.

The invention claimed is:

1. A communication apparatus comprising:
    a signal receiving portion operative to receive an arriving communication signal for producing an input information signal corresponding to the arriving communication signal;
    a framed data producing portion operative to receive the input information signal from the signal receiving portion for producing framed data based on the input information signal, said framed data forming a data frame containing a frame header segment wherein identification information relating to the input information signal is provided and an information segment wherein communication information transferred by the input information signal is provided;
    a framed data processing portion operative to receive the framed data from the framed data producing portion for storing the framed data provided with an additional header segment in first memory means, and further operative to take out information provided in each of the additional header segment and the frame header segment of the framed data stored in the first memory means for forming header data and then transmitting the header data through a data transmission path;
    a header data treating portion operative to receive the header data transmitted through the data transmission path from the framed data processing portion for storing the header data in second memory means and further operative to take out the header data stored in the second memory means;
    a history data treating portion operative, to receive the header data taken out from the second memory means by the header data treating portion for preserving selected header data of the header data from the second memory means as history data in third memory means;
    first managing means for controlling operations of the header data treating portion and the history data treating portion to make a comparison between the header data taken out from the second memory means and the history data preserved in the third memory means, processing the header data stored in the second memory means in response to a result of the comparison to obtain a processed header data, and transmitting the processed header data through the data transmission path to the framed data processing portion;
    second managing means for causing the framed data processing portion to make selectively a change in the identification information provided in the frame header segment of the framed data stored in the first memory means in response to the processed header data transmitted to the framed data processing portion and to produce framed data for transmission based on the framed data stored in the first memory means;

an output information signal producing portion operative to receive the framed data for transmission from the framed data processing portion for producing output information signal based on the framed data for transmission; and a signal transmitting portion operative to receive the output information signal from the output information producing portion for transmitting an output communication signal based on the output information signal.

2. A communication apparatus according to claim 1, wherein each of said first, second and third memory means is constituted with a ring buffer.

3. A communication apparatus according to claim 1, wherein said framed data producing portion comprises a digital signal generating portion operative to receive the input information signal from the signal receiving portion for producing an input information digital signal based on the input information signal and a reassembling portion operative receive the input information digital signal from the digital signal generating portion for causing the input information digital signal to be subjected to reassembling process to produce said framed data.

4. A communication apparatus according to claim 3, wherein said output information signal producing portion comprises a segmenting portion operative to receive the framed data for transmission from the framed data processing portion for causing the framed data for transmission to be subjected to segmenting process to produce output digital data and an analog signal generating portion operative to receive the output digital data from the segmenting portion for producing the output information signal based on said output digital data.

5. A communication apparatus according to claim 4, wherein said reassembling portion and said segmenting portion are so constituted as to be included in a segmenting and reassembling portion.

6. A communication apparatus according to claim 1, wherein said framed data processing portion comprises said first memory means and a data control portion operative, under a control by said second managing means, to control writing of the framed data in said first memory means, reading of the framed data from said first memory means and transmission of the framed data read from said first memory means.

7. A communication apparatus according to claim 1, wherein said header data treating portion comprises said second memory means and a header data memory control portion operative to control writing of the header data in said second memory means and reading of the header data from said second memory means.

8. A communication apparatus according to claim 1, wherein said third memory means in said history data treating portion comprises first and second separated memory means so that the selected history data is preserved in said second separated memory means, and said history data treating portion comprises said third memory means and a history data memory control portion operative to control writing of the header data obtained from the header data treating portion in said first separated memory means, reading of the header data from said first separated memory means and preservation of the selected header data read from said first separated memory means in said second separated memory means.

9. A communication apparatus according to claim 1, wherein said first managing means comprises a central control portion and a data processing portion operative, under a control by said central control portion, to cause the header data treating portion to control writing of the header data in the second memory means, reading of the header data from the second memory means and transmission of the header data read from the second memory means and further to cause the history data treating portion to control preservation of the selected header data in the third memory means.

* * * * *